F. SMITH.
FRUIT CLIPPER.
APPLICATION FILED MAY 5, 1915.
1,180,450.
Patented Apr. 25, 1916.
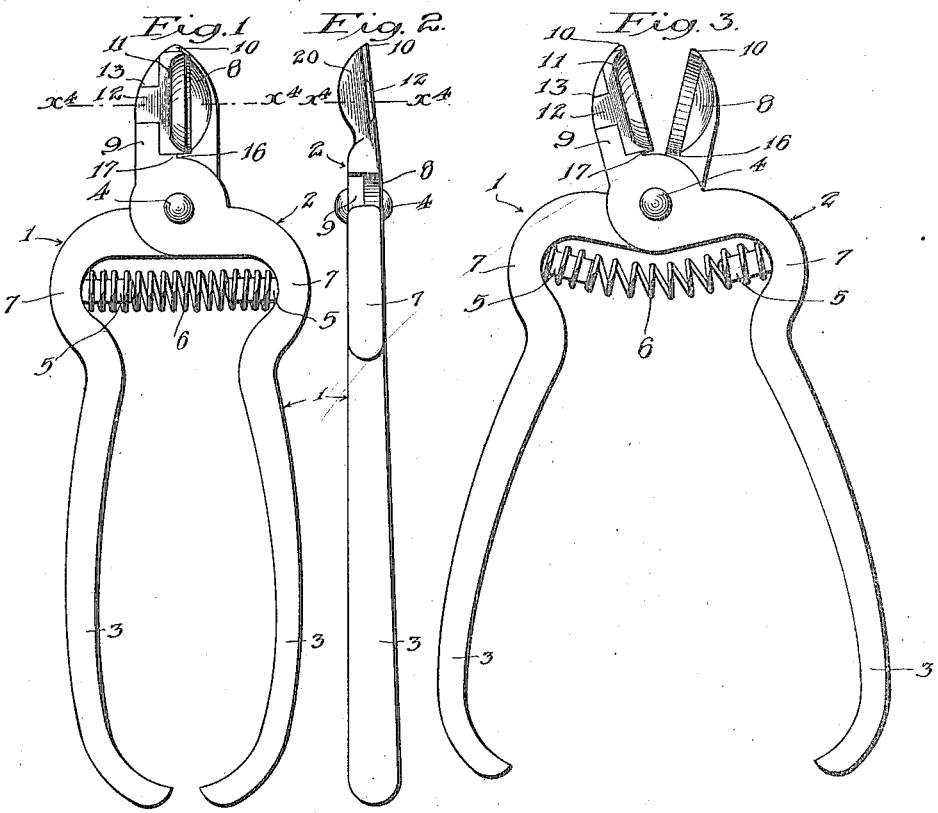
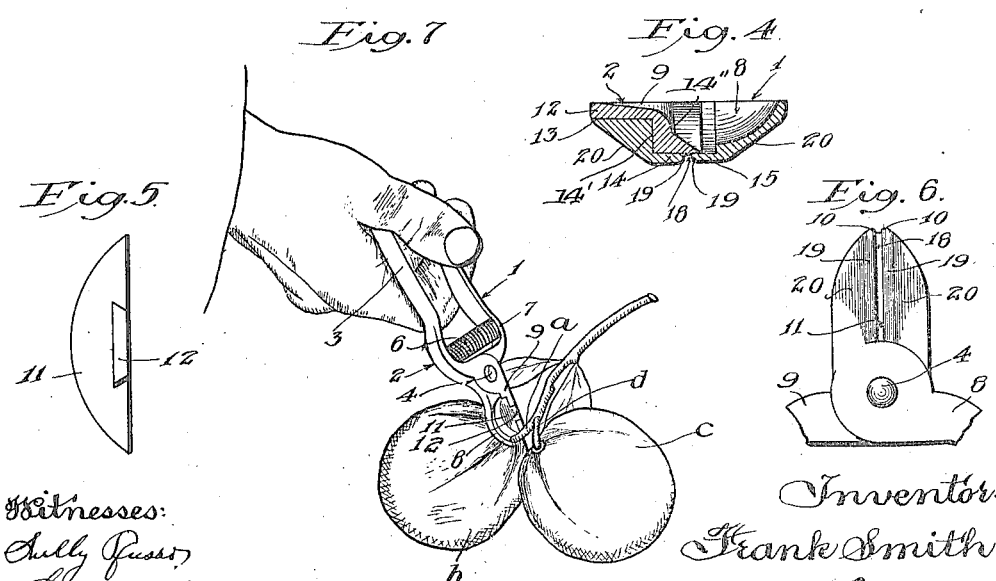
Inventor
Frank Smith

UNITED STATES PATENT OFFICE.

FRANK SMITH, OF CORONA, CALIFORNIA.

FRUIT-CLIPPER.

1,180,450.   Specification of Letters Patent.   Patented Apr. 25, 1916.

Application filed May 5, 1915.   Serial No. 25,960.

*To all whom it may concern:*

Be it known that I, FRANK SMITH, a citizen of the United States, residing at Corona, in the county of Riverside and State of California, have invented a new and useful Fruit-Clipper, of which the following is a specification.

An object of this invention is to effect severing the stems of fruit without bruising and cutting the fruit.

It is of great importance in the fruit growing industry and more especially in the gathering of citrus fruits that the fruit be left unbruised and uncut by any instrument used in severing the stem of the fruit, that some stem be allowed to remain on the fruit and that the length of such remaining stem be minimized so that the fruit will remain in prime condition during shipment and storage. It is especially difficult in cutting oranges from orange trees, when using clippers of the kind heretofore in use, to cut the stem of the fruit close to the fruit without cutting the rind of the orange owing to the fact that the oranges grow in clusters at the ends of short branching twigs and for the reason that the rind is very soft and very susceptible to being cut and bruised by the clippers when the clippers are being placed in position and manipulated to cut the stem. Cutting and bruising the rind of citrus fruits and pulling the stems therefrom result in decay of the fruits, and if the stems be not exceedingly short said stems will puncture the rinds of adjacent fruits.

In order to avoid as much as possible the production of objectionable, so-termed, clipper cuts, a fruit clipper has heretofore been devised having severing blades abutting one another in the cutting operation. This was an improvement on the old style of clipper, but in practice it is found that the blades of said clipper in a short time become dull and worn in the middle, thereby mashing the stems in the cutting operation and leaving filaments of some of the stems entirely unsevered, and leaving in the stems of others a small hole of pin head size. Naturally, when the picker of the fruit finds that the stem is not entirely severed, he finishes the severing operation by twisting and pulling the fruit. This pulling the fruit to break the stem tends to cause the rind to be drawn slightly from the pulp, and the picker in endeavoring to avoid such pulling away of the rind from the pulp, gives the clipper a sidewise twist and such twist causes the side of the clipper to be roughly pressed against the rind adjacent the stem of the orange, thus causing scratching and breaking of the rind, and the acid oozing out soon causes decay of the rind and ultimate decay of the pulp.

Another object of this invention is to so construct the clipper as to facilitate cutting the stems quite close to the fruit and at the same time guard the fruit against clipper cuts and bruising.

Another object is the production of a device of this character having a keen cutting blade or knife which may be readily detached from its mounting so that when the knife becomes dull from use a sharp knife may be inserted in its stead.

The accompanying drawings illustrate the invention: Figure 1 is an obverse side view of the clipper in closed position. Fig. 2 is an edge view from the left of Fig. 1. Fig. 3 is an obverse side view of the clipper shown in Fig. 1 expanded or open. Fig. 4 is an enlarged cross section on line indicated by $x^4$—$x^4$, Figs. 1 and 2. Fig. 5 is an edge view of the blade or knife. Fig. 6 is a fragmental reverse side view of the clipper in closed position. Fig. 7 is a perspective view of the clippers in Figs. 1, 2 and 3 as they appear held in the operator's hand in cutting position on the stem of fruit.

There are provided two pivotally connected members 1, 2 having bow shaped handles 3 at one end to fit the palm of the hand of the user. The pivot is shown at 4 and said members 1, 2 are provided with studs 5 inserted in the opposite ends of a coil expansion spring 6 which operates to expand or open the clipper in a manner readily understood.

Each of the members 1, 2 between the bow shaped handles 3 and pivot 4 is bent to form goose necks or U-shaped portions 7, the studs 5 projecting inward from the base of said goose necks.

The members 1, 2 are extended on the other side of the pivot 4 to form a cutter bar 8 and cutter blade body 9 respectively, said cutter bar and cutter blade body when in closed position together forming a bowl shaped cutting nose having a slightly rounded tip 10.

The cutter blade body 9 is provided with a curved blade or knife 11 which may be formed integral with the body but is preferably separately constructed as shown in the drawings, being provided with a dovetail shank 12 extending transversely therefrom and detachably inserted in a dovetail slot 13 in the upper face of the cutting blade body 9, and the member 1 is provided with a flange 14 forming a guard extending the full length of the knife and underlying said knife, as clearly shown in Fig. 4.

At the inner end of the flange 14, the knife 11 forms a shoulder 14' perpendicular to said flange, said flange and shoulder together forming an angular seat in which fits the angular body 14" of the knife. Thus the dove-tailed construction together with the angular body and seat are sufficient to produce a secure mounting for the knife without it being necessary to employ other fastening means such as screws and the like.

It is noted that the flanges 14, 15, are relatively thin and form the floor of the bowl-shaped nose, and that the knife 11 projects over the edge of the flange of the cutter blade body and is designed to have shearing engagement with the upper face of the flange of the cutter bar when the body and bar are in closed position and the flanges are slightly spaced apart from one another, see Fig. 4. It is also noted that the engaging faces of the knife 11 and flanges 14, 15 are flat transversely thereof, though they are curved longitudinally. This construction permits of clean cutting of the stem of the fruit and at the same time the flanges 14, 15 guard the fruit from contact with the knife, thus preventing injury being done to the fruit.

The cutter bar 8 is provided with a flange 15 forming a guard extending the full length of the knife 11 and underlying the same when the members 1, 2 are in the closed position as in Fig. 4. The flange 14 is narrower than the width of the knife 11 and the flanges 14, 15, when the clippers are in closed position, are slightly spaced apart by opposing stops 16, 17 to form a channel 18 so as to preclude the possibility of pinching or cutting the rind of the fruit between the edges of the flanges when said flanges are forced toward one another in the clipping operation, said flanges being provided with rounded edges 19. Thus the flanges 14, 15 cannot be forced closer together than shown in Figs. 4 and 6. The knife 11 is seated on the flange 14 and projects sufficiently beyond the edge of said flange to bridge across the channel 18 and engage the flange 15 when said flanges are in closed position.

The cutter bar 8 and cutter blade body 9, are curved longitudinally on their bottom faces and said bottom faces extend from the flanges 14, 15 respectively transversely aslant upward and outward to form triangular flat faces 20, the curvature combined with the slant reducing the tip portions of the members 1, 2 to minimum width and thickness so that the tip portions of the cutter bar 8 and knife 9 and flanges 14, 15 can be readily caused to engage the opposite sides of the stem $a$ of the fruit $b$ close to the stem end of said fruit without any liability of thrusting the tip portions 10 against the rind of the adjacent fruit $c$ on the stem $d$.

The foregoing makes clear the construction and operation of the device.

What I claim is:

1. A fruit clipper comprising a cutter blade body, a cutter bar pivotally connected to said cutter blade body, said body and bar together forming a bowl-shaped cutting nose and provided with relatively thin transversely flat flanges forming the floor of the bowl-shaped nose, and a knife projecting over the edge of the flange of the cutter blade body and designed to have shearing engagement with the upper face of the flange of the cutter bar when the body and bar are in closed position and the flanges are slightly spaced apart from one another.

2. A fruit clipper comprising a cutter blade body having a flange and having a shoulder perpendicular to said flange and having a dove-tailed slot, said flange and shoulder together forming an angular seat, a knife having an angular body engaging said seat and having a dove-tailed shank to engage said dove-tailed slot, and a cutter bar pivotally connected to the cutter blade body and provided with a flange, said knife projecting over the edge of the flange of the cutter-blade body and designed to have shearing engagement with the upper face of the flange of the cutter bar when the body and bar are in closed position and the flanges are slightly spaced apart from one another.

In testimony whereof, I have hereunto set my hand at Corona, California, this 28th day of April, 1915.

FRANK SMITH.

In presence of—
HERBERT M. KEY,
JNO. P. KEY.